US012812428B2

(12) United States Patent
Ma et al.

(10) Patent No.: US 12,812,428 B2
(45) Date of Patent: Nov. 24, 2026

(54) PHYSICAL LAYER CROSS-LINK INTERFERENCE MEASUREMENT AND REPORTING

(71) Applicant: QUALCOMM Incorporated, San Diego, CA (US)

(72) Inventors: Ruifeng Ma, Beijing (CN); Chenxi Hao, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 938 days.

(21) Appl. No.: 17/918,867

(22) PCT Filed: May 6, 2020

(86) PCT No.: PCT/CN2020/088703
§ 371 (c)(1),
(2) Date: Oct. 13, 2022

(87) PCT Pub. No.: WO2021/223089
PCT Pub. Date: Nov. 11, 2021

(65) Prior Publication Data
US 2023/0247459 A1 Aug. 3, 2023

(51) Int. Cl.
*H04W 24/10* (2009.01)
*H04B 17/318* (2015.01)
*H04B 17/336* (2015.01)

(52) U.S. Cl.
CPC .......... *H04W 24/10* (2013.01); *H04B 17/318* (2015.01); *H04B 17/336* (2015.01)

(58) Field of Classification Search
None
See application file for complete search history.

(56) References Cited

U.S. PATENT DOCUMENTS

| | | | | |
|---|---|---|---|---|
| 11,139,875 | B2 | 10/2021 | Wei | |
| 11,924,819 | B2 | 3/2024 | Cai et al. | |
| 2012/0093012 | A1 * | 4/2012 | Pedersen .............. | H04W 24/10 370/252 |

(Continued)

FOREIGN PATENT DOCUMENTS

| | | | |
|---|---|---|---|
| CN | 110637494 | A | 12/2019 |
| KR | 20180058779 | A | 6/2018 |

(Continued)

OTHER PUBLICATIONS

Qualcomm Incorporated: "Remaining Issues on CLI-RSSI and SRS-RSRP Measurement", 3GPP Draft, 3GPP TSG-RAN2 Meeting #107, R2-1909474, 3rd Generation Partnership Project (3GPP), Mobile Competence Centre; 650, Route Des Lucioles; F-06921 Sophia-Antipolis Cedex; France, vol. RAN WG2, No. Prague, Czech Republic, Aug. 26, 2019-Aug. 30, 2019, Aug. 16, 2019, XP051767273, 9 Pages, paragraph 4, paragraph 2.1, paragraph [ 0002]—paragraph [ 0006].

(Continued)

*Primary Examiner* — Scott M Sciacca
(74) *Attorney, Agent, or Firm* — Patterson & Sheridan LLP

(57) ABSTRACT

Aspects of the present disclosure relate to wireless communications, and more particularly, to techniques for physical layer cross-link interference (CLI) measurement and reporting.

26 Claims, 9 Drawing Sheets

(56) References Cited

U.S. PATENT DOCUMENTS

| | | | | |
|---|---|---|---|---|
| 2014/0078919 | A1* | 3/2014 | Hammarwall | H04B 7/0626 370/252 |
| 2020/0106488 | A1 | 4/2020 | Akoum et al. | |
| 2020/0107309 | A1 | 4/2020 | Akoum et al. | |
| 2020/0120531 | A1 | 4/2020 | Qin et al. | |
| 2021/0144574 | A1* | 5/2021 | Jin | H04B 17/328 |
| 2021/0167877 | A1* | 6/2021 | Choi | H04W 24/08 |
| 2021/0250797 | A1* | 8/2021 | Karjalainen | H04W 24/10 |
| 2022/0159596 | A1* | 5/2022 | Kim | H04J 11/00 |

FOREIGN PATENT DOCUMENTS

| | | | |
|---|---|---|---|
| KR | 20190128220 | A | 11/2019 |
| WO | 2017173033 | A1 | 10/2017 |
| WO | 2019032021 | A1 | 2/2019 |
| WO | 2019032779 | A1 | 2/2019 |
| WO | 2019220005 | A1 | 11/2019 |
| WO | 2020242760 | A1 | 12/2020 |

OTHER PUBLICATIONS

Supplementary European Search Report—EP20934545—Search Authority—Munich—Jan. 4, 2024.

"3rd Generation Partnership Project; Technical Specification Group Radio Access Network; NR; Radio Resource Control (RRC) Protocol specification (Release 16)", 3GPP TS 38.331, V16.0.0 (Mar. 2020), 3rd Generation Partnership Project, Mobile Competence Centre, 650, Route Des Lucioles, F-06921 Sophia-Antipolis Cedex, France, vol. RAN WG2, No. V16.0.0, Apr. 6, 2020, 832 pages, XP051893854, Paragraph [0735], section 5.5.1, Paragraph "5.5.4.4 Event A3", "5.5.4.5 Event A4", "5.5.4.6 Event A5", section 5.5.1 and 5.5.5.1.

International Search Report and Written Opinion—PCT/CN2020/088703—ISA/EPO—Jan. 28, 2021.

Intel Corporation, "UE-to-UE CLI Measurement and Reporting", 3GPP TSG RAN WG1 Ad-Hoc Meeting 1901, R1-1900489, Jan. 21-Jan. 25, 2019, 5 pages, Jan. 1, 2019.

* cited by examiner

PHYSICAL LAYER CROSS-LINK INTERFERENCE MEASUREMENT AND REPORTING

CROSS-REFERENCE TO RELATED APPLICATIONS

This application is a national stage application under 35 U.S.C. 371 of PCT/CN2020/088703 filed May 6, 2020, which is hereby expressly incorporated by reference herein in its entirety as if fully set forth below and for all applicable purposes.

TECHNICAL FIELD

Aspects of the present disclosure relate to wireless communications, and more particularly, to techniques for physical layer measurement and reporting of cross-link interference.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes receiving a resource configuration indicating a time and frequency cross-link interference (CLI) measurement resource for physical layer measurement of CLI caused by uplink transmission by one or more other UEs during downlink slots of the UE, receiving a report configuration indicating time resources of CLI reporting occasions, measuring at least one CLI metric based on measurements taken in a measurement occasion according to the resource configuration, and reporting the at least one CLI metric in a reporting occasion according to the report configuration.

Certain aspects of the present disclosure provide a method for wireless communications by a network entity. The method generally includes signaling a user equipment (UE) a resource configuration indicating a time and frequency cross-link interference (CLI) measurement resource for physical layer measurement of CLI caused by uplink transmission by one or more other UEs during downlink slots of the UE, signaling the UE a report configuration indicating time resources of CLI reporting occasions, and receiving, from the UE, reporting of at least one CLE metric based on measurements taken in a measurement occasion according to the resource configuration, wherein the reporting is received in a reporting occasion according to the report configuration.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
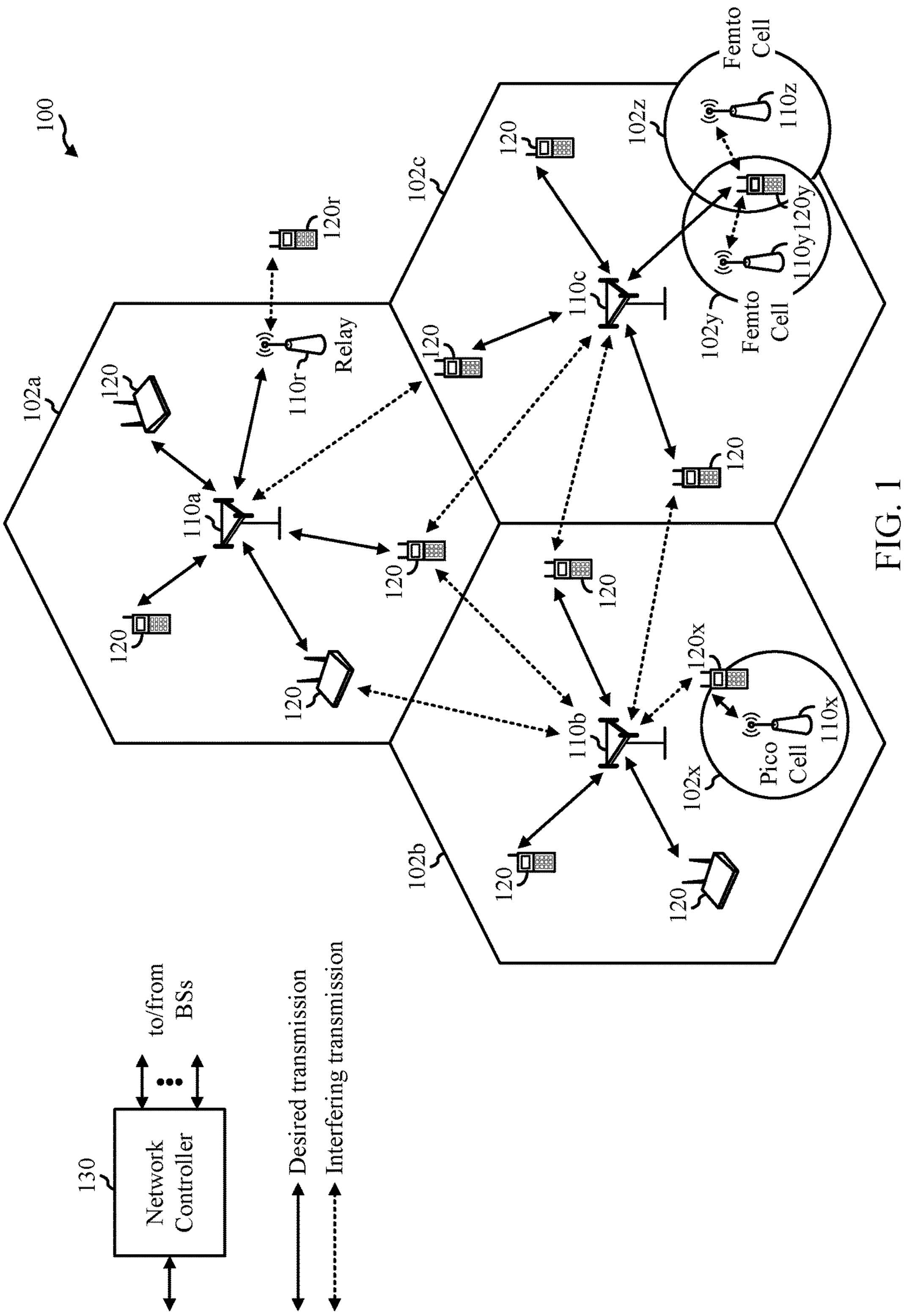
FIG. 1 is a block diagram conceptually illustrating an example telecommunications system, in accordance with certain aspects of the present disclosure.

Aspects of the present disclosure relate to wireless communications, and more particularly, to techniques for physical layer measurement and reporting of cross-link interference (CLI).

When compared with higher layer (e.g., layer 3) CLI reporting mechanisms, the techniques presented herein may provide greater flexibility and faster reporting, due to only physical layer processing and by avoiding inter-layer communications for each CLI report.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., an NR/5G network), in which aspects of the present disclosure may be performed. For example, the wireless network 100 may include a UE 120 configured to perform operations 600 of FIG. 6 for physical layer CLI measurement and reporting. Similarly, the wireless network 100 may include a base station 110 configured to perform operations 700 of FIG. 7 to configure a UE for physical layer physical layer CLI measurement and reporting.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. ABS for a pico cell may be referred to as a pico BS. ABS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a base station (BS), Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS. Other lines show component to component (e.g., UE to UE) communication options.

Figure 2:
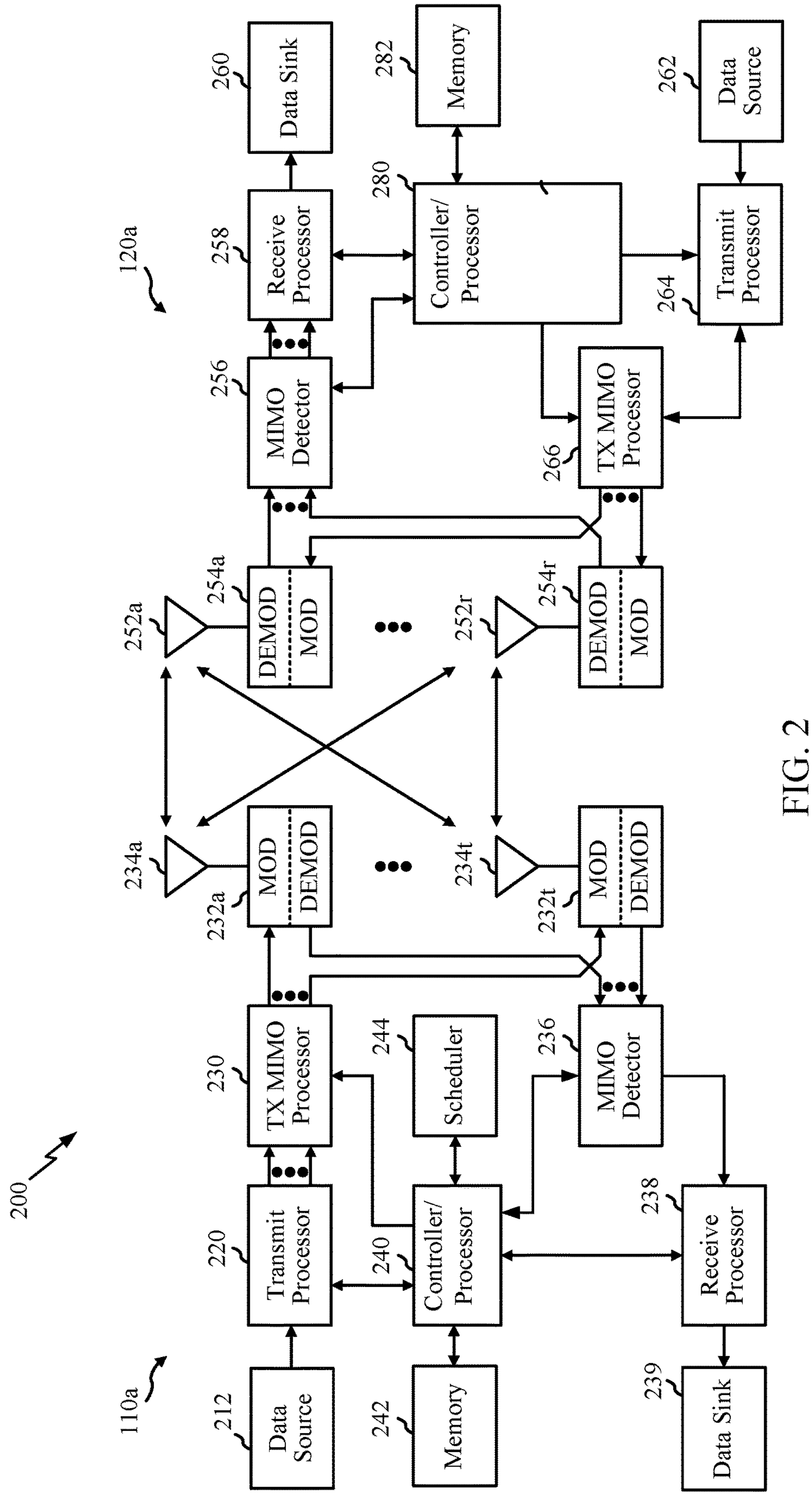
FIG. 2 is a block diagram conceptually illustrating a design of an example base station (BS) and user equipment (UE), in accordance with certain aspects of the present disclosure.

FIG. 2 illustrates example components of BS 110*a* and UE 120*a* (e.g., in the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

The controller/processor 280 and/or other processors and modules at the UE 120*a* may perform or direct the execution of processes for the techniques described herein. For example, controller/processor 280 and/or other processors and modules at the UE 120*a* may perform (or be used by UE 120*a* to perform) operations 600 of FIG. 6. Similarly, the controller/processor 240 and/or other processors and modules at the BS 110*a* may perform or direct the execution of processes for the techniques described herein. For example, controller/processor 240 and/or other processors and modules at the BS 110*a* may perform (or be used by BS 121*a* to perform) operations 700 of FIG. 7. Although shown at the controller/processor, other components of the UE 120*a* or BS 110*a* may be used to perform the operations described herein.

Embodiments discussed herein may include a variety of spacing and timing deployments. For example, in LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
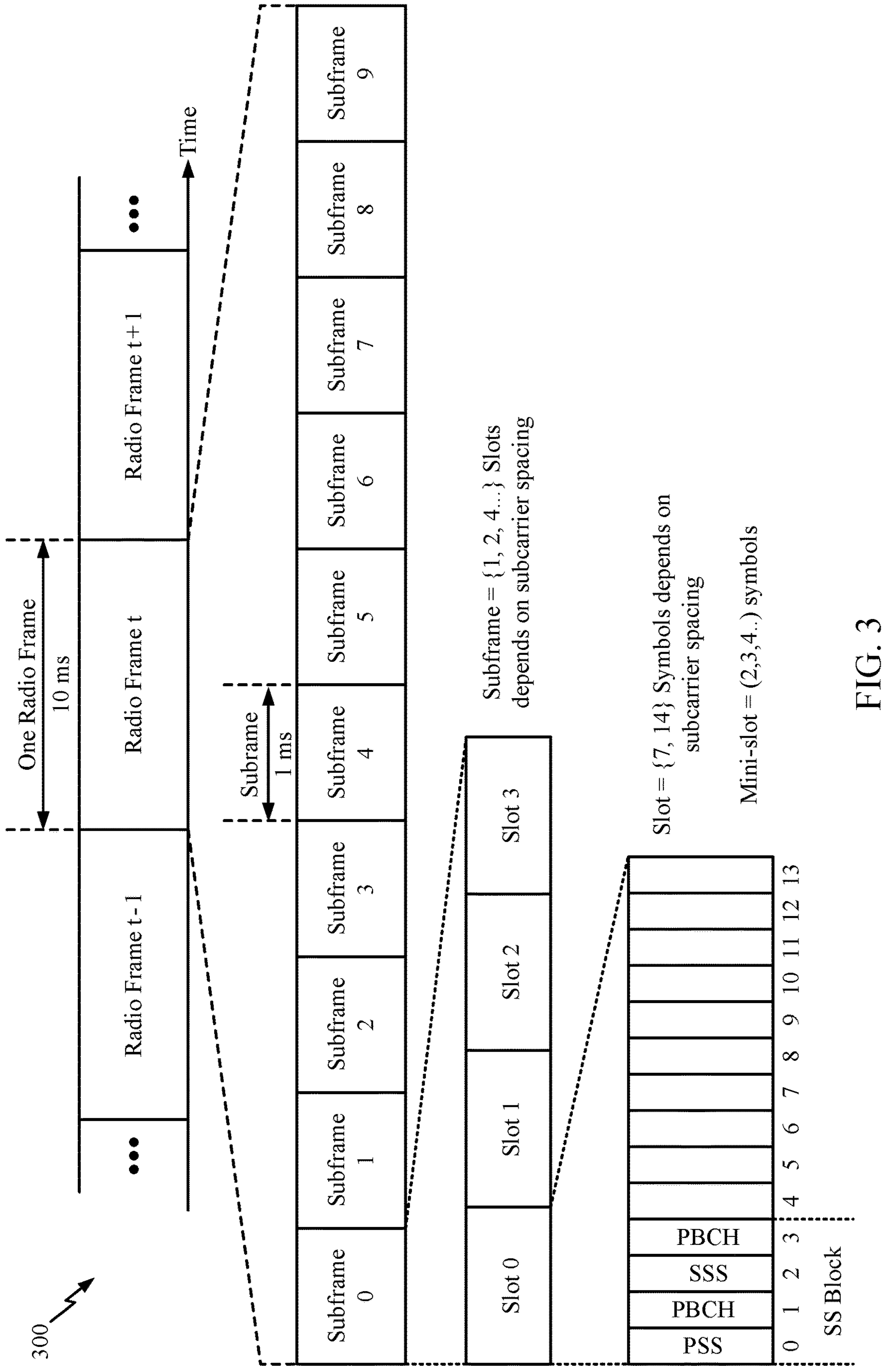
FIG. 3 illustrates an example of a frame format for a new radio (NR) system, in accordance with certain aspects of the present disclosure.

FIG. 3 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

Example Physical Layer (Layer 1) CLI Measurement and Reporting

Aspects of the present disclosure relate to wireless communications, and more particularly, to techniques for physical layer measurement and reporting of cross-link interference (CLI). By relying only on physical layer processing, the CLI reporting mechanisms proposed herein may provide greater flexibility and faster reporting when compared with conventional CLI reporting mechanisms.

Figure 4:
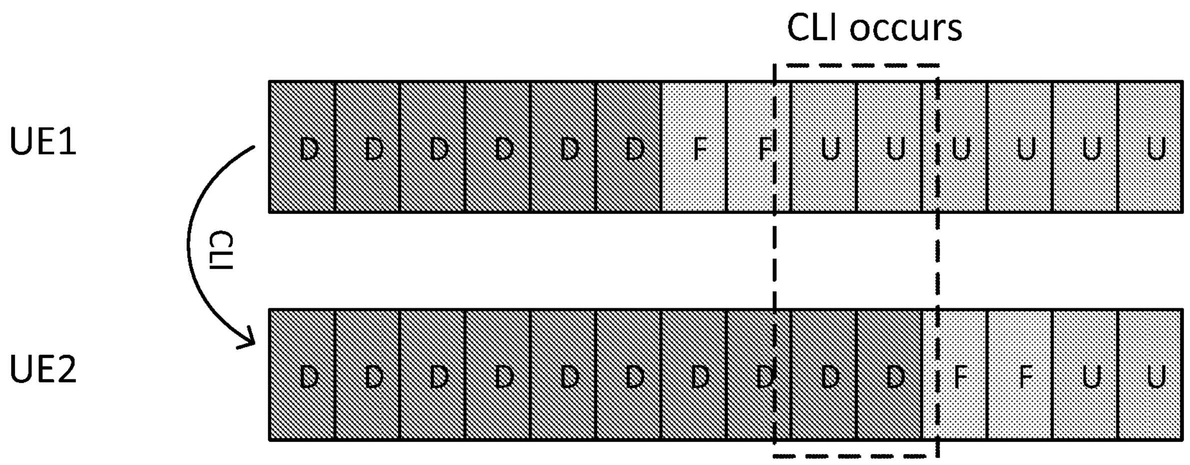
FIG. 4 illustrates how cross-link interference might occur when uplink subframes of one UE overlap with downlink subframes of another UE.

As illustrated in FIG. 4, if nearby UEs have different UL-DL slot formats, one UE (the victim) may receive UL transmission from another UE (the aggressor), known as cross-link interference (CLI). In the illustrated example, UE1 is the aggressor and CLI occurs within a UL symbol (i.e., an interfering symbol) of the aggressor (UE1) that collides with a DL symbol of the victim (UE2). CLI can be caused by any UL transmission from the aggressor UE including PUCCH, PUSCH, RACH preamble, and SRS transmissions.

In some cases, measurement of CLI can be configured at the victim UE for interference management, typically at higher layers. For example, Layer-3 measurement and reporting mechanisms for CLI may be defined. In such cases, measurement can be sounding reference signal (SRS) reference signal received power (RSRP) based on a configured SRS measurement resource and CLI received signal strength indicator (RSSI) based on a configured CLI RSSI measurement resource. The measurement resource configuration typically includes periodicity, frequency (RBs), and OFDM symbols where CLI is measured.

While FIG. 4 illustrates a conceptual relationship between an aggressor UE's and a victim UE's slots, in reality, there can be timing difference between them due to various propagation delays. Whether a victim UE can receive its DL serving cell signals/channels and also measure a CLI resource in the same symbol may depend on the UE capability.

Generally, a victim UE does not need to know the aggressor TDD UL/DL configuration (i.e., slot formats) or SRS transmission configuration. To measure the CLI, the victim UE only needs to follows the network signaled CLI measurement resource configuration. Victim UE does not even need to know the identity of the aggressor UE associated with each configured CLI measurement resource. As a practical matter, the network should be responsible for configuring the CLI measurement resource to match the TDD UL/DL configuration or SRS transmission configuration of the aggressor UE (although there may be no such requirement).

Figure 5A:
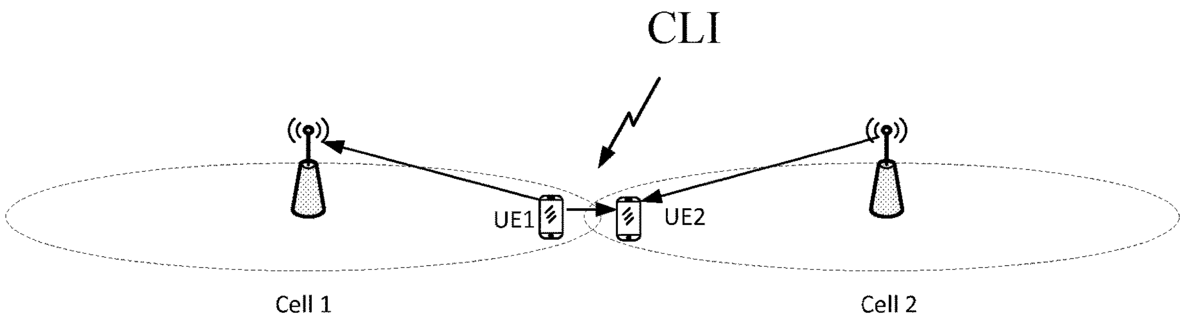
FIGS. 5A and 5B illustrate examples of cross-link interference that may be measured and reported, in accordance with certain aspects of the present disclosure.
Figure 5B:
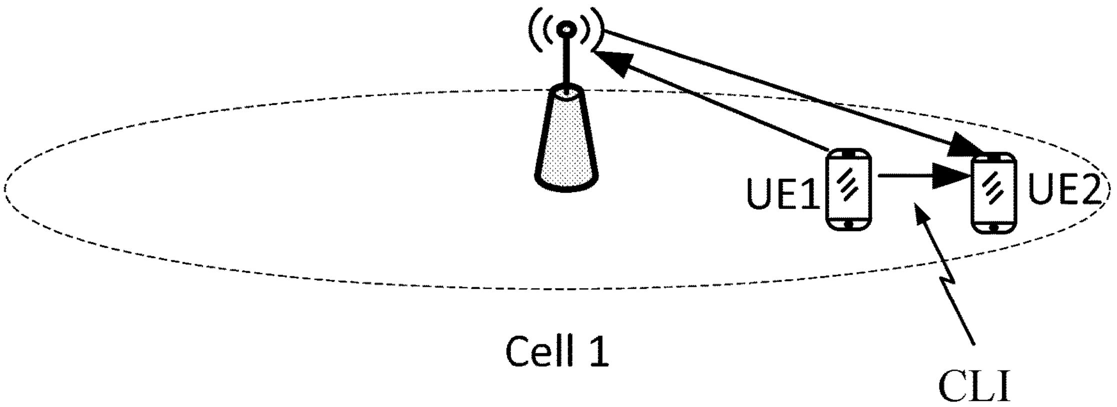

As illustrated in FIG. 5A, CLI may occur between UEs in different cells. As illustrated in FIG. 5B, CLI may occur between UEs within the same cell.

As previously described, some systems may utilize CLI measurement metrics that include SRS-RSRP and CLI-RSSI. SRS-RSRP is generally reported as the linear average of the power contributions of the SRS to be measured over the configured resource elements within the considered measurement frequency bandwidth in the time resources in the configured measurement occasions. CLI-RSSI is generally reported as the linear average of the total received power observed only in certain OFDM symbols of measurement time resource(s), in the measurement bandwidth, over the configured resource elements for measurement by the UE.

Conventional systems typically only support layer 3 a reporting mechanism, which is sufficient for measuring the long term energy of a CLI measurement resource. However, layer 3 CLI reporting is not flexible and fast enough for measuring the dynamic CLI due to dynamic TDD configuration of the aggressor UE.

Aspects of the present disclosure, however, propose a physical layer (Layer 1) measurement and report of CLI which, when compared to the conventional layer 3 framework, may be more flexible and faster due to reliance on only physical layer processing without the need for additional inter-lay (i.e., between layer 1 and layer 3) communication for each CLI report.

Figure 6:
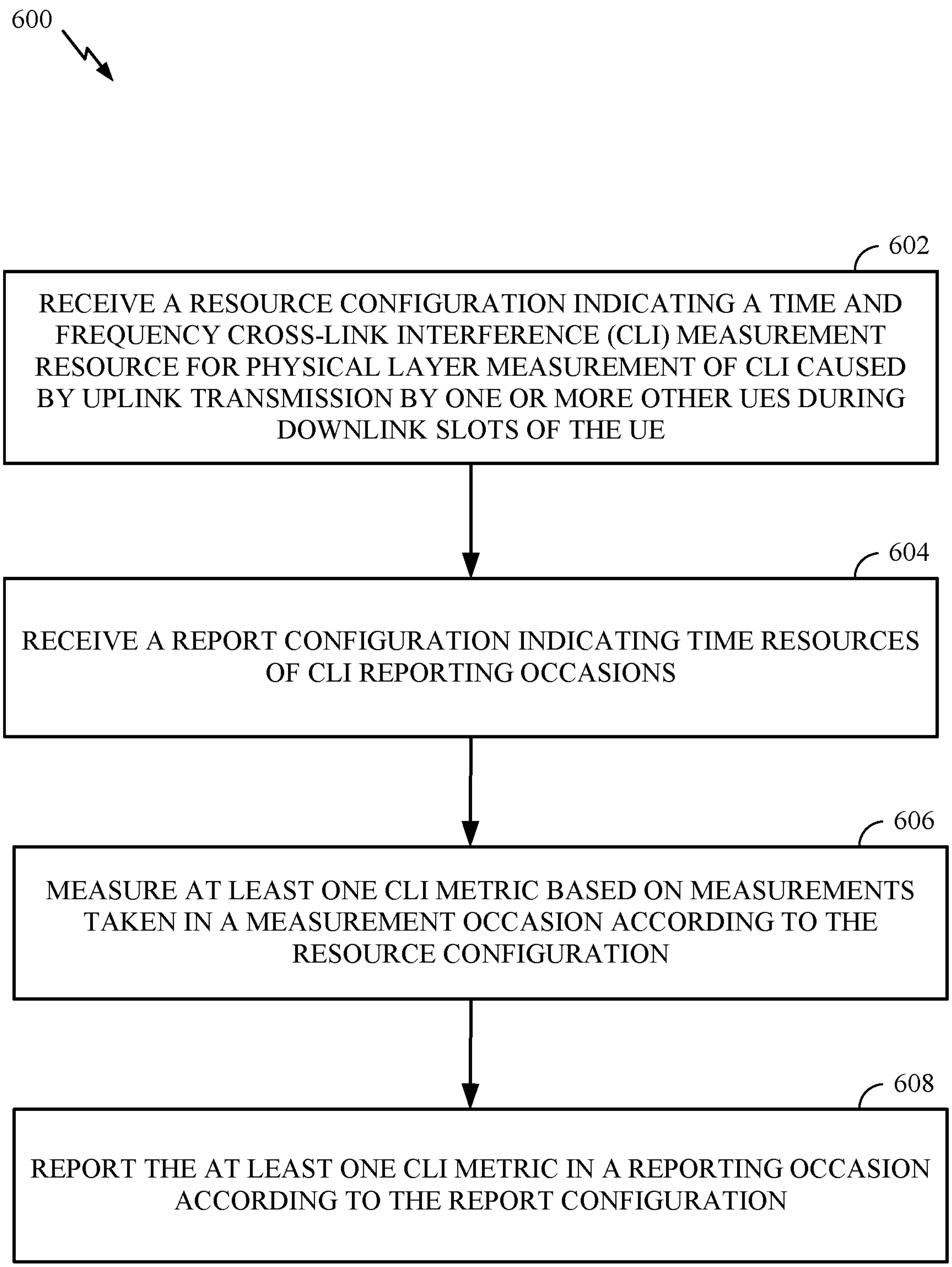
FIG. 6 illustrates example operations for wireless communications by a user equipment (UE), in accordance with certain aspects of the present disclosure.
Figure 7:
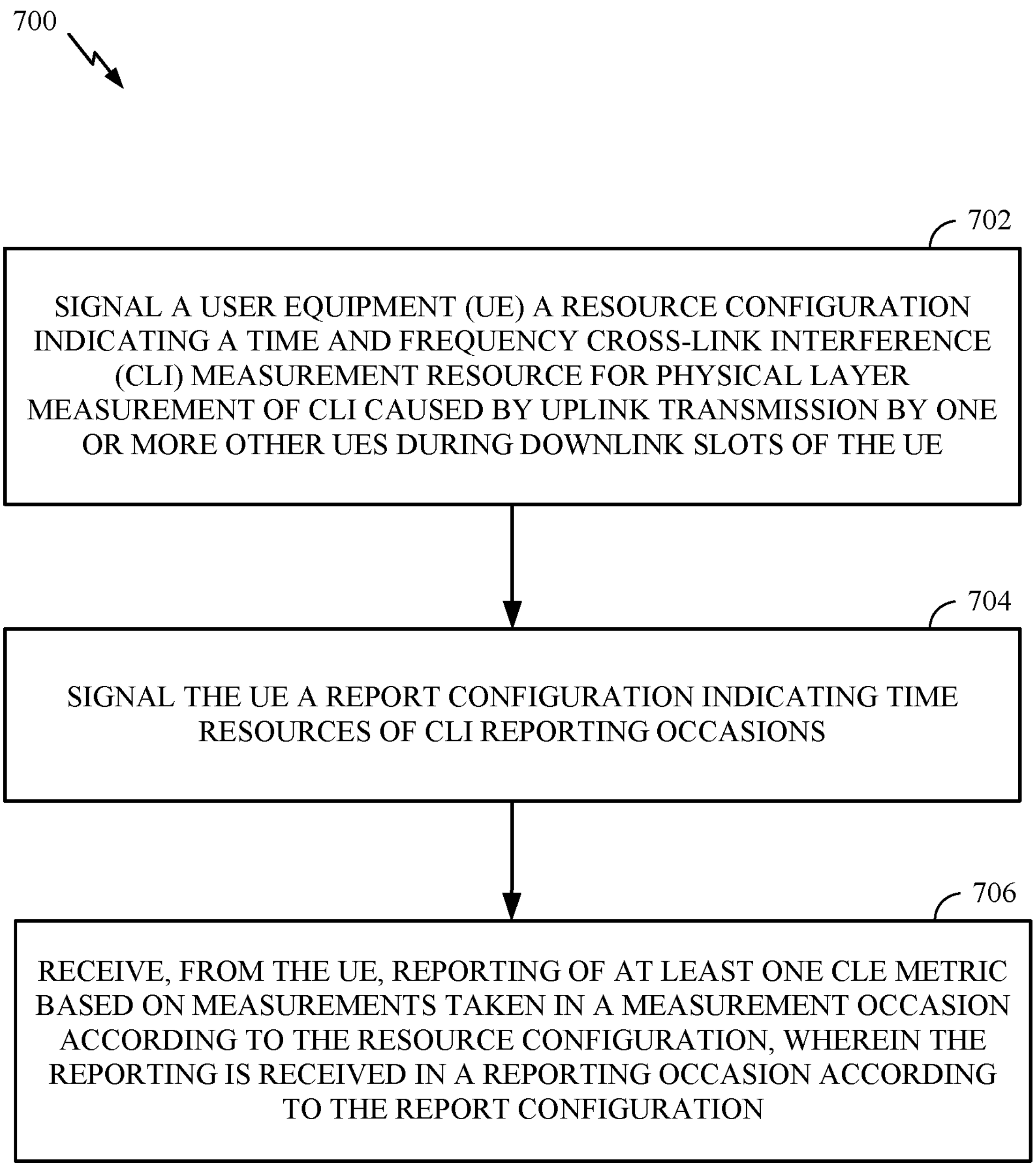
FIG. 7 illustrates example operations for wireless communications by a network entity, in accordance with certain aspects of the present disclosure.

FIGS. 6 and 7 illustrate example operations that may be performed by a UE and network entity, respectively, for performing physical layer CLI measurement and reporting, in accordance with aspects of the present disclosure.

FIG. 6 illustrates example operations 600 for wireless communications by a UE, in accordance with certain aspects of the present disclosure. For example, operations 600 may be performed by a UE 120 of FIG. 1 for physical layer CLI measurement and reporting.

Operations 600 begin, at 602, by receiving a resource configuration indicating a time and frequency cross-link interference (CLI) measurement resource for physical layer measurement of CLI caused by uplink transmission by one or more other UEs during downlink slots of the UE. At 604, the UE receives a report configuration indicating time resources of CLI reporting occasions. In some cases, the resource configuration indicates a type for the CLI measurement resource as periodic, semi-persistent or aperiodic and the report configuration indicates a type for the CLI measurement report as periodic, semi-persistent or aperiodic.

At 606, the UE measures at least one CLI metric based on measurements taken in a measurement occasion according to the resource configuration. At 608, the UE reports the at least one CLI metric in a reporting occasion according to the report configuration. As will be described in greater detail below, in some cases, the UE may determine the reporting occasion for reporting the CLI metric measured based on an association of the resource configuration with the report configuration.

FIG. 7 illustrates example operations 700 for wireless communications by a network entity and may be considered complementary to operations 600 of FIG. 6. For example, operations 700 may be performed by a base station 110 of FIG. 1 (e.g., a gNB) to configure a UE (performing operations 600 of FIG. 6) for physical layer CLI measurement and reporting.

Operations 700 begin, at 702, by signaling a user equipment (UE) a resource configuration indicating a time and frequency cross-link interference (CLI) measurement resource for physical layer measurement of CLI caused by uplink transmission by one or more other UEs during downlink slots of the UE. At 704, the network entity signals the UE a report configuration indicating time resources of CLI reporting occasions. At 706, the network entity receives, from the UE, reporting of at least one CLE metric based on measurements taken in a measurement occasion according to the resource configuration, wherein the reporting is received in a reporting occasion according to the report configuration.

As noted above, the CLI measurement resource configuration and report configuration may enable the layer 1 CLI measurement and reporting by the UE (i.e., a victim UE).

In general, the CLI measurement resource configuration indicates the time and frequency resource where the measurement resource is to be received by the UE, time domain periodicity, and an offset (e.g., a slot/symbol offset) for the measurement resource. If the resource is a reference signal, the configuration may also indicate parameters for the generation of the reference signal, as well as a mapping of the sequence to the configured time and frequency resources.

The CLI report configuration generally indicates the time domain occasion where the measurement should be carried out (and/or reported) by the UE. The CLI report configuration generally includes periodicity and offset for the measurement occasion.

The CLI measurement resource configuration and CLI report configuration may be independently configured. Both configurations can indicate a type of periodic, semi persistent, and periodic. If the CLI measurement resource configuration indicates a CLI resource type as aperiodic, the aperiodic CLI measurement resource may be triggered by PDCCH. If the CLI report configuration indicates a CLI report type as aperiodic, the aperiodic CLI measurement report may be triggered by PDCCH.

In some cases, the network may associate a resource configuration for a resource and report configuration, so that the UE can measure the resource and sends to network the report in the associated report occasions.

Figure 8:
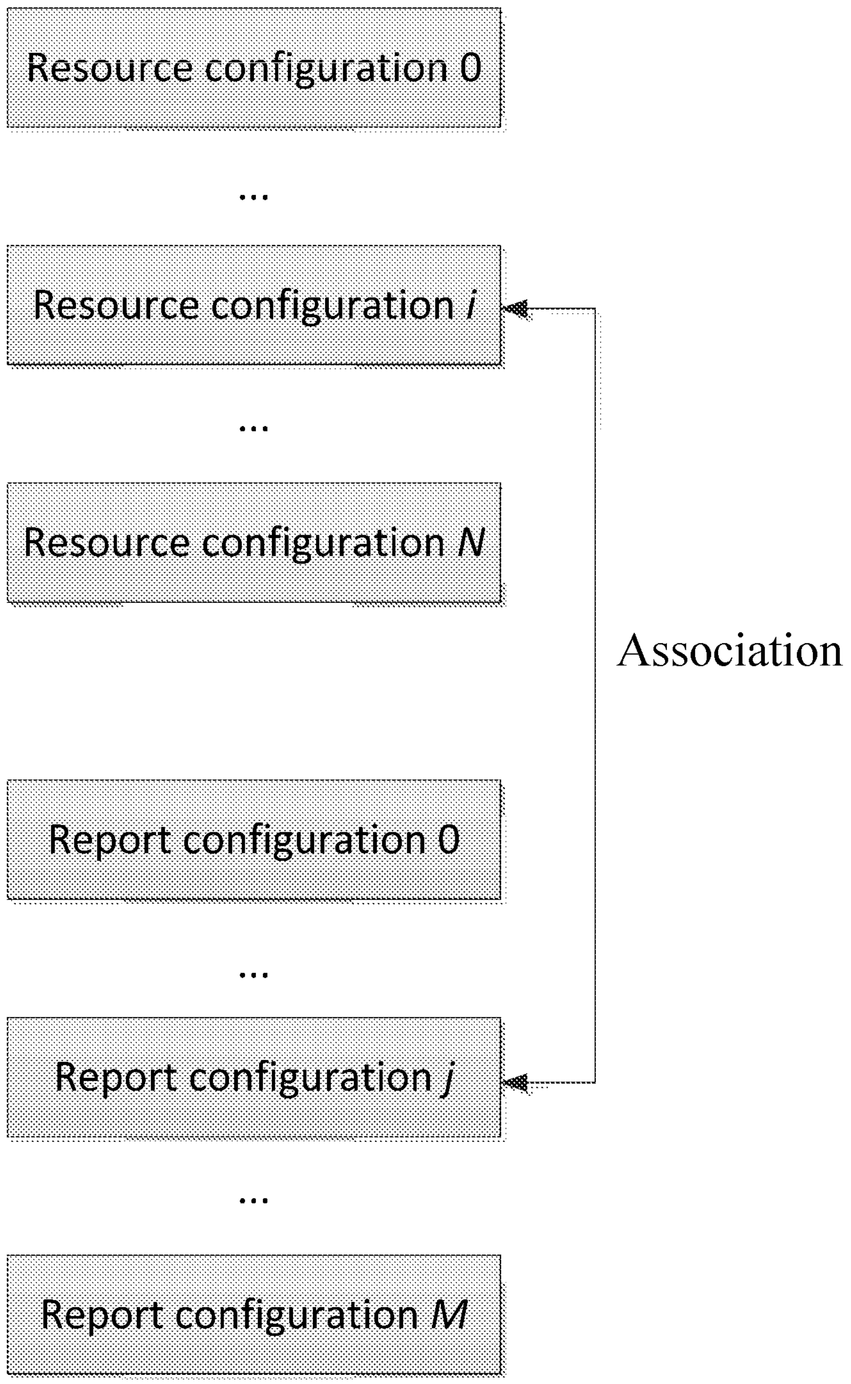
FIG. 8 illustrates examples of physical layer CLI measurement resource and reporting configurations, in accordance with certain aspects of the present disclosure.

FIG. 8 illustrates an example, with an association between CLI measurement resource configuration i and CLI report configuration j, so the UE would measure the resource for CLI measurement resource configuration j and send the report in a report occasion per CLI report configuration j.

The network may indicate the associations between a CLI resource configuration and CLI report configuration according to various options. According to a first option, the network may include a resource configuration ID of a configured CLI measurement resource in a report configuration. As an alternative, or in addition, the network could include a report configuration ID of a CLI report configuration in a CLI resource configuration.

In some cases, only certain types of CLI report configuration can be associated with certain types of CLI resource configurations. In general, a more semi-static CLI measurement resource can be used for both semi-static and dynamic CLI reporting, but not the other way round. The association between the CLI resource configuration and CLI report configuration may be considered valid for the following cases:

- If CLI resource type is periodic, the associated CLI report type can be periodic, semi-persistent or aperiodic;
- If CLI resource type is semi-persistent, the associated CLI report type can be semi-persistent or aperiodic; and
- If CLI resource type is aperiodic, the associated CLI report type can only be aperiodic.

Figure 9A:
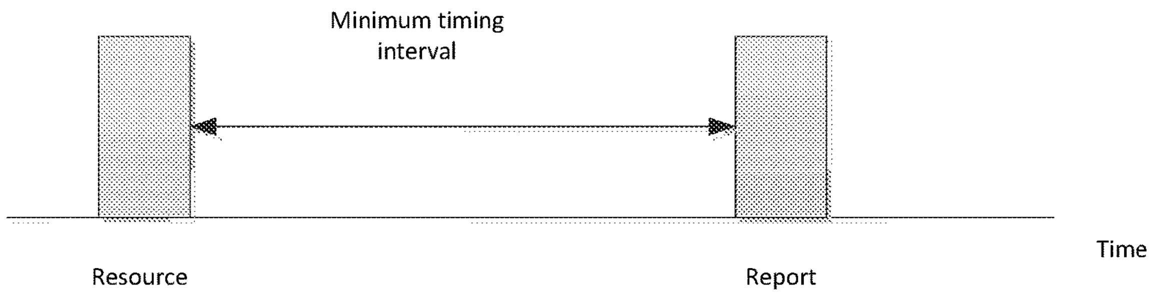
FIGS. 9A-9C illustrate examples of minimum timing delays for physical layer CLI measurement reporting, in accordance with certain aspects of the present disclosure.

If neither the CLI resource type nor the CLI report type are aperiodic, the latest CLI measurement resource that can be used to generate the report may have a minimum timing interval before the report, as illustrated in FIG. 9A. The interval can be defined in unit of ms, slots or symbols. In this case, the CLI measurement resource and report are not dynamically configured to the UE. There needs to be a minimum delay between the latest resource that can be used to generate the report, in order to accommodate the minimum required processing time for UE (i.e., victim UE) to process the resource and generate the report.

In some cases, the minimum timing interval may depend on the CLI metric type (e.g., whether RSSI or RSRP). For example, for CLI RSSI, the minimum timing interval may be the same as or smaller than that for CLI RSRP, due to the generally simpler computation for RSSI relative to CLI RSRP computation.

Figure 9B:
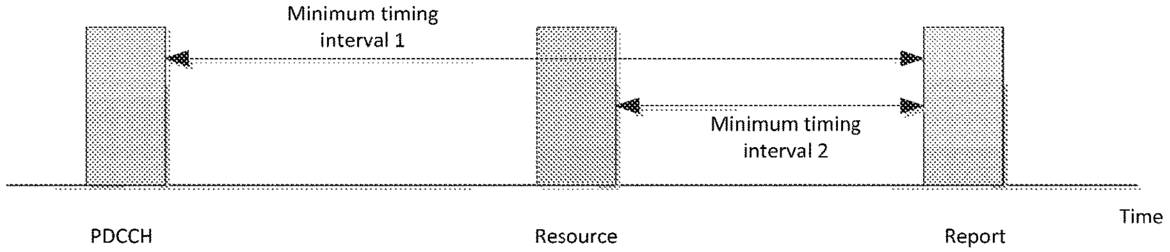

If both CLI resource type and CLI report type are aperiodic there may be a first minimum timing interval between the PDCCH that triggers the resource and the report and a second minimum timing interval between the triggered resource and the report, as illustrated in FIG. 9B. As noted above, the intervals can be defined in unit of ms, slots or symbols.

The first timing interval (labeled Minimum timing interval 1 in FIG. 9B) is to accommodate the minimum processing time for PDCCH decoding, resource processing and report generation. The second timing interval is to accommodate the minimum resource processing and report generation time. There may be no need to define a minimum interval between the PDCCH and the resource. This is because if the UE cannot decode PDCCH fast enough, it may just buffer some DL samples for potential resource reception. The second timing interval (labeled Minimum timing interval 2 in FIG. 9B) may be considered the most critical time line requirement, in order to allow the UE to have enough time to compute the CLI measurement metric. Each of the minimum timing intervals shown in FIG. 9B can be the same or smaller for CLI RSSI than that for CLI RSRP.

Figure 9C:
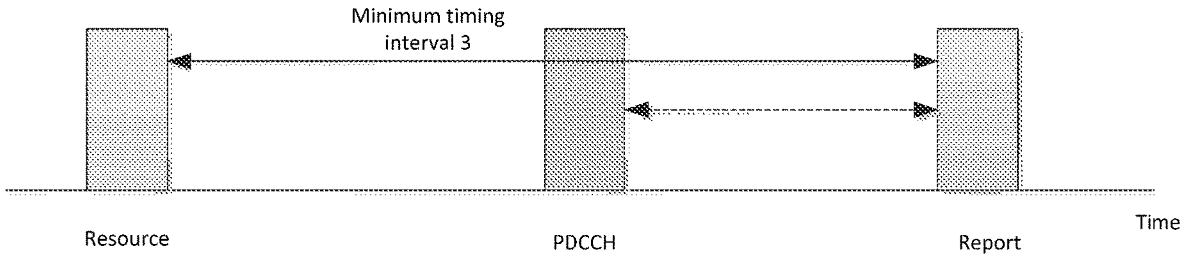

If CLI resource type is not aperiodic and CLI report type is aperiodic, the latest resource that can be used to generate a report may also have a minimum timing interval before the report, labeled Minimum timing interval 3 in FIG. 9C. The interval can be defined in unit of ms, slots or symbols.

In this case, the CLI measurement resource can be semi-persistent or periodic. The reason to define minimum timing interval 3 is still because the UE needs to have enough time to compute the CLI measurement metric. The reason that no minimum timing interval between the PDCCH (triggering the aperiodic report) and report (i.e., indicated by the dashed line in figure) needs to be defined is because the UE can always compute the CLI measurement metric for a semi-persistent/periodic resource no matter whether it receives the PDCCH or not. So it can generate the report and then once the UE decodes a triggering PDCCH, it can send the triggered report. As with the other cases described above, the minimum timing interval 3 for CLI RSSI can be the same as or smaller than that for CLI RSRP.

When the CLI measurement resource type is not aperiodic (i.e., is periodic or semi-persistent), there can be a time domain measurement restriction for the CLI measurement. For example, when the restriction is configured, the UE may only be allowed to use the latest transmission occasion of the CLI measurement resource before the defined timing interval. When the restriction is not configured, the UE may be allowed to use any transmission occasions of the CLI measurement resource before the defined timing interval.

As proposed herein, physical layer CLI measurement and reporting may allow for faster and more flexible CLI reporting, which may allow for quicker adaptation at the network side. For example, a gNB may be able to re-allocate resources and/or adapt scheduling to account for dynamic TDD configuration changes of the aggressor UE.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, processors controller/processor 280 of the UE 120 120 may be configured to perform operations 600 of FIG. 6, while controller/processor 240 of the BS 110 shown in FIG. 2 may be configured to perform operations 700 of FIG. 7.

Means for receiving may include a receiver (such as one or more antennas or receive processors) illustrated in FIG. 2. Means for transmitting may include a transmitter (such as one or more antennas or transmit processors) illustrated in FIG. 2. Means for determining, means for processing, means for treating, and means for applying may include a processing system, which may include one or more processors of the UE 120 and/or one or more processors of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:

receiving a resource configuration indicating a time and frequency cross-link interference (CLI) measurement resource for physical layer measurement of CLI caused by uplink transmission by one or more other UEs during downlink slots of the UE;

receiving a report configuration indicating time resources of CLI reporting occasions;

measuring at least one CLI metric based on measurements taken in a measurement occasion according to the resource configuration;

determining a reporting occasion for reporting the at least one CLI metric measured based on an association of the resource configuration with the report configuration, wherein:

if the CLI measurement resource is of a periodic type, allowable types for an associated CLI report include periodic, semi-persistent or aperiodic type;

if the CLI measurement resource is of a semi-persistent type, allowable types for an associated CLI report include semi-persistent or aperiodic types; and if the CLI measurement resource is aperiodic, allowable types for an associated CLI report include aperiodic type; and reporting the at least one CLI metric in the reporting occasion according to the report configuration.

2. The method of claim 1, wherein the resource configuration also indicates parameters for generating a reference signal sequence and for mapping the sequence to the configured time and frequency resources.

3. The method of claim 1, wherein:

the resource configuration indicates a type for the CLI measurement resource as periodic, semi-persistent or aperiodic; and the report configuration indicates a type for the CLI measurement report as periodic, semi-persistent or aperiodic.

4. The method of claim 1, wherein the association is indicated via:

a resource configuration ID of a configured resource provided in the report configuration; or a report configuration ID of a report configuration provided in the resource configuration.

5. The method of claim 1, wherein the reporting occasion occurs a first minimum timing interval after a latest measurement resource that can be used for measuring the reported CLI metric.

6. The method of claim 5 wherein the first minimum timing interval depends, at least in part, on a type of the CLI metric.

7. The method of claim 6, wherein, the first minimum timing interval is smaller for a receive signal strength indicator (RSSI) CLI type than for a reference signal receive power (RSRP) CLI type.

8. The method of claim 5, wherein, if both the CLI measurement resource type and CLI measurement report type are aperiodic, the reporting occasion occurs a second minimum timing interval after a physical downlink control channel (PDCCH) that triggers the CLI measurement resource.

9. The method of claim 8 wherein the second minimum timing interval depends, at least in part, on a type of the CLI metric.

10. The method of claim 9, wherein, the second minimum timing interval is smaller for a receive signal strength indicator (RSSI) CLI type than for a reference signal receive power (RSRP) CLI type.

11. The method of claim 5, wherein:

when the CLI measurement resource type is not aperiodic, the configuration indicates whether or not there is a time domain measurement restriction configured for the CLI measurement;

when the restriction is configured, the UE is allowed to use only the latest transmission occasion of the measurement resource before the first minimum timing interval; and when the restriction is not configured, the UE is allowed to use more than just the latest transmission occasion of the measurement resource before the first minimum timing interval.

12. A method for wireless communications by a network entity, comprising:

determining a reporting occasion for receiving at least one CLI metric measured based on an association of a resource configuration with a report configuration;

signaling a user equipment (UE) the resource configuration indicating a time and frequency cross-link interference (CLI) measurement resource for physical layer measurement of CLI caused by uplink transmission by one or more other UEs during downlink slots of the UE;

signaling the UE the report configuration indicating time resources of CLI reporting occasions, wherein:

if the CLI measurement resource is of a periodic type, allowable types for an associated CLI report include periodic, semi-persistent or aperiodic type;

if the CLI measurement resource is of a semi-persistent type, allowable types for an associated CLI report include semi-persistent or aperiodic types; and if the CLI measurement resource is aperiodic, allowable types for an associated CLI report include aperiodic type; and receiving, from the UE, reporting of the at least one CLE metric based on measurements taken in a measurement occasion according to the resource configuration, wherein the reporting is received in the reporting occasion according to the report configuration.

13. The method of claim 12, wherein the resource configuration also indicates parameters for generating a reference signal sequence and for mapping the sequence to the configured time and frequency resources.

14. The method of claim 12, wherein:

the resource configuration indicates a type for the CLI measurement resource as periodic, semi-persistent or aperiodic; and the report configuration indicates a type for the CLI measurement report as periodic, semi-persistent or aperiodic.

15. The method of claim 12, wherein the association is indicated via:

a resource configuration ID of a configured resource provided in the report configuration; or a report configuration ID of a report configuration provided in the resource configuration.

16. The method of claim 12, wherein the reporting occasion occurs a first minimum timing interval after a latest measurement resource that can be used for measuring the reported CLI metric.

17. The method of claim 16 wherein the first minimum timing interval depends, at least in part, on a type of the CLI metric.

18. The method of claim 17, wherein, the first minimum timing interval is smaller for a receive signal strength indicator (RSSI) CLI type than for a reference signal receive power (RSRP) CLI type.

19. The method of claim 16, wherein, if both the CLI measurement resource type and CLI measurement report type are aperiodic, the reporting occasion occurs a second minimum timing interval after a physical downlink control channel (PDCCH) that triggers the CLI measurement resource.

20. The method of claim 19 wherein the second minimum timing interval depends, at least in part, on a type of the CLI metric.

21. The method of claim 20, wherein, the second minimum timing interval is smaller for a receive signal strength indicator (RSSI) CLI type than for a reference signal receive power (RSRP) CLI type.

22. The method of claim 16, wherein:

when the CLI measurement resource type is not aperiodic, the configuration indicates whether or not there is a time domain measurement restriction configured for the CLI measurement;

when the restriction is configured, the UE is allowed to use only the latest transmission occasion of the measurement resource before the first minimum timing interval; and when the restriction is not configured, the UE is allowed to use more than just the latest transmission occasion of the measurement resource before the first minimum timing interval.

23. An apparatus for wireless communications by a user equipment (UE), comprising:

means for receiving a resource configuration indicating a time and frequency cross-link interference (CLI) measurement resource for physical layer measurement of CLI caused by uplink transmission by one or more other UEs during downlink slots of the UE;

means for receiving a report configuration indicating time resources of CLI reporting occasions;

means for measuring at least one CLI metric based on measurements taken in a measurement occasion according to the resource configuration;

means for determining a reporting occasion for reporting the at least one CLI metric measured based on an association of the resource configuration with the report configuration, wherein:

if the CLI measurement resource is of a periodic type, allowable types for an associated CLI report include periodic, semi-persistent or aperiodic type;

if the CLI measurement resource is of a semi-persistent type, allowable types for an associated CLI report include semi-persistent or aperiodic types; and if the CLI measurement resource is aperiodic, allowable types for an associated CLI report include aperiodic type; and means for reporting the at least one CLI metric in the reporting occasion according to the report configuration.

24. An apparatus for wireless communications by a network entity, comprising:

means for determining a reporting occasion for receiving at least one CLI metric measured based on an association of a resource configuration with a report configuration;

means for signaling a user equipment (UE) the resource configuration indicating a time and frequency cross-link interference (CLI) measurement resource for physical layer measurement of CLI caused by uplink transmission by one or more other UEs during downlink slots of the UE;

means for signaling the UE the report configuration indicating time resources of CLI reporting occasions, wherein:

if the CLI measurement resource is of a periodic type, allowable types for an associated CLI report include periodic, semi-persistent or aperiodic type;

if the CLI measurement resource is of a semi-persistent type, allowable types for an associated CLI report include semi-persistent or aperiodic types; and if the CLI measurement resource is aperiodic, allowable types for an associated CLI report include aperiodic type; and means for receiving, from the UE, reporting of the at least one CLE metric based on measurements taken in a measurement occasion according to the resource configuration, wherein the reporting is received in the reporting occasion according to the report configuration.

25. An apparatus for wireless communications by a user equipment (UE), comprising:

a receiver configured to receive a resource configuration indicating a time and frequency cross-link interference (CLI) measurement resource for physical layer measurement of CLI caused by uplink transmission by one or more other UEs during downlink slots of the UE and to receive a report configuration indicating time resources of CLI reporting occasions;

at least one processor configured to:

measure at least one CLI metric based on measurements taken in a measurement occasion according to the resource configuration; and determine a reporting occasion for reporting the at least one CLI metric measured based on an association of the resource configuration with the report configuration, wherein:

if the CLI measurement resource is of a periodic type, allowable types for an associated CLI report include periodic, semi-persistent or aperiodic type;

if the CLI measurement resource is of a semi-persistent type, allowable types for an associated CLI report include semi-persistent or aperiodic types; and if the CLI measurement resource is aperiodic, allowable types for an associated CLI report include aperiodic type; and a transmitter configured to transmit a report of the at least one CLI metric in the reporting occasion according to the report configuration.

26. An apparatus for wireless communications by a network entity, comprising:

at least one processor configured to determine a reporting occasion for receiving at least one CLI metric measured based on an association of a resource configuration with a report configuration;

a transmitter configured to signal a user equipment (UE) the resource configuration indicating a time and frequency cross-link interference (CLI) measurement resource for physical layer measurement of CLI caused by uplink transmission by one or more other UEs during downlink slots of the UE and to signal the UE the report configuration indicating time resources of CLI reporting occasions, wherein:

if the CLI measurement resource is of a periodic type, allowable types for an associated CLI report include periodic, semi-persistent or aperiodic type;

if the CLI measurement resource is of a semi-persistent type, allowable types for an associated CLI report include semi-persistent or aperiodic types; and if the CLI measurement resource is aperiodic, allowable types for an associated CLI report include aperiodic type; and a receiver configured to receive, from the UE, reporting of the at least one CLE metric based on measurements taken in a measurement occasion according to the resource configuration, wherein the reporting is received in the reporting occasion according to the report configuration.

* * * * *